United States Patent [19]

Sikora

[11] Patent Number: 5,005,017
[45] Date of Patent: Apr. 2, 1991

[54] MULTIPLE PULSE DELAY PROCESSOR
[75] Inventor: Gary J. Sikora, Columbia, Md.
[73] Assignee: Westinghouse Electric Corp., Pittsburgh, Pa.
[21] Appl. No.: 508,455
[22] Filed: Apr. 13, 1990
[51] Int. Cl.$^5$ ............................................. G01S 7/40
[52] U.S. Cl. .................................................. 342/172
[58] Field of Search ........................................ 342/172

[56] References Cited

U.S. PATENT DOCUMENTS

| H513 | 8/1988 | Dunne et al. | 364/514 |
|---|---|---|---|
| 4,292,634 | 9/1981 | Wu et al. | 342/25 |
| 4,450,447 | 5/1984 | Zebker et al. | 342/171 |
| 4,635,061 | 1/1987 | Lepere et al. | 342/195 |
| 4,794,543 | 12/1988 | Enein et al. | 364/486 |
| 4,879,561 | 11/1989 | Inkol | 342/195 |

Primary Examiner—Gilberto Barrón, Jr.
Assistant Examiner—John B. Sotomayor
Attorney, Agent, or Firm—John K. Williamson

[57] ABSTRACT

A transmit pulse delay processor for simulating delayed radar reflections from a target and a method for simulating delayed radar reflections. The pulse delay process utilizes a counter, an adder, a FIFO and a comparator. The pulse delay processor maintains input pulse width and features a programmable delay. The depth selected for the FIFO determines the number of transmit pulses that can be simultaneously delayed. The frequency of the resolution clock clocking the counter and the number of bits in the counter can be selected both to accommodate the length of delay required and to achieve better output pulse accuracy. The pulse delay processor has various applications, but is particularly useful in radar simulation where multiple input pulses must be simultaneously delayed.

3 Claims, 1 Drawing Sheet

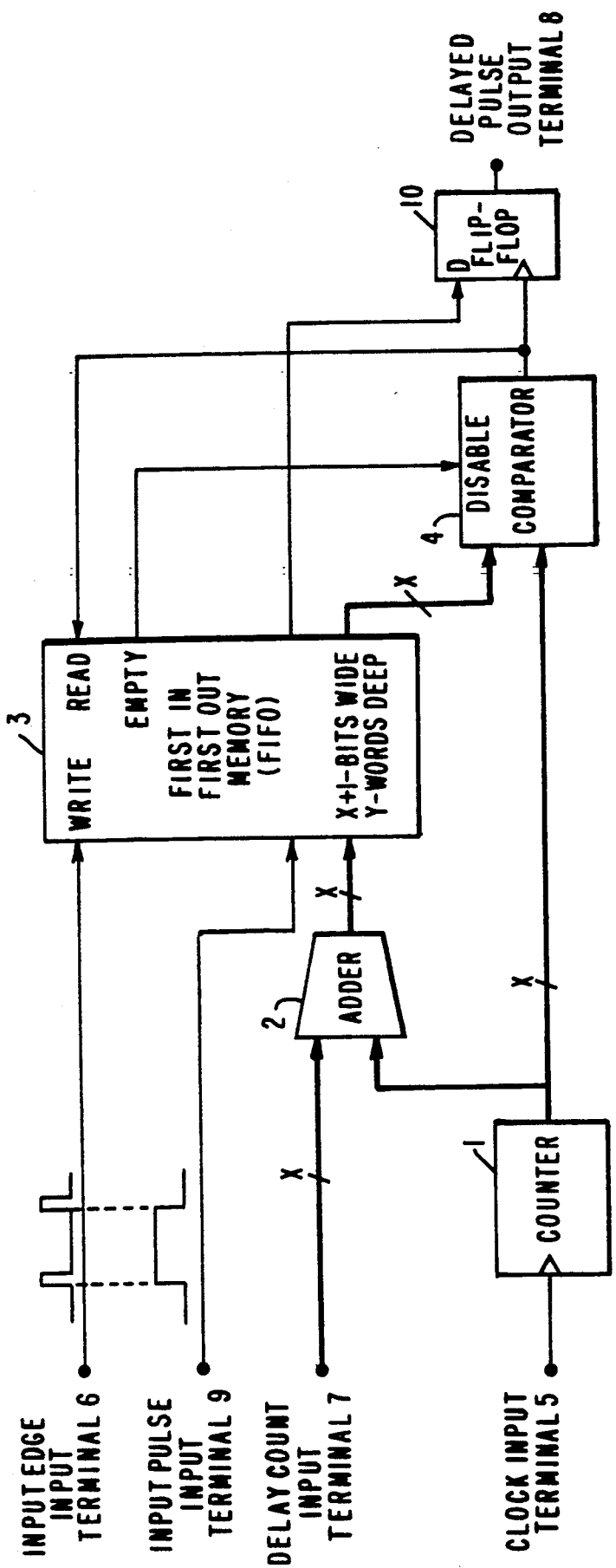

MULTIPLE PULSE DELAY PROCESSOR

BACKGROUND OF THE INVENTION

1. Field of the Invention

This invention relates to an arrangement (apparatus and method) for simulating radar targets. More particularly, this arrangement delays radar transmissions to generate simulated reflections from a single simulated target.

2. Description of the Prior Art

There are two commonly used techniques for generating delayed transmit pulses, each of which has certain operational disadvantages or difficulties.

The most commonly used technique utilizes a series of counters Each counter is programmed to output a pulse a given number of clock cycles after a transmit signal is introduced to the counter. Successive transmit pulses are supplied to successive counters The outputs of the counters are then multiplexed to form a composite delayed reflection signal.

One problem with this technique is that the pulse width of the delayed pulses is not the same as the pulse widths of the input pulses In the prior art multiple counter scheme, the duration of the pulses output from the counters are a fixed number of clock cycles Therefore, more circuitry must be added to modify pulse widths in the composite signal to duplicate pulse widths in the input signal.

Another problem with this technique is that a large number of counters is required when the desired delay is greater than the time between transmit pulses. Because each counter must output its delayed transmit pulse before it can accept another input pulse, delay processors utilizing this technique may require excessive numbers of parallel counters.

The second technique commonly used in delay processors utilizes a pulse generator to delay incoming transmit pulses. A certain amount of time after an input pulse triggers the pulse generator, a pulse of a predetermined fixed duration is generated. Therefore, as in the multiple counter method, the output pulses do not maintain the pulse width of the input pulses. The pulse width of the output pulse is preprogrammed and static. Furthermore, pulse generators ignore their inputs when delaying previous pulses. The pulse generator technique, therefore, suffers the additional disadvantage that in a rapid succession of pulses not all transmit pulses generate corresponding output pulses.

Both of these known techniques of simulating target reflections, the multiple counter scheme and the pulse generator scheme, present problems when the desired delay of the delay processor is greater than the period between transmit pulses. The counter technique requires excessive hardware and the pulse generator technique fails to generate output pulses. In addition, neither of these schemes outputs an output pulse stream whose pulse widths corresponds to the pulse widths in the input pulse stream.

SUMMARY OF THE INVENTION

To overcome the problems associated with the known simulation techniques, the present invention provides a multiple pulse delay processor that does not require a separate counter for each simultaneously delayed input pulse and does not require additional circuitry to maintain the input pulse width. Instead, the present invention writes two separate words into a first-in-first-out memory (hereafter referred to as a FIFO) for every input pulse. One word is written on the rising edge of the pulse and another word is written on the falling edge of the pulse. The word written into the FIFO is composed of two parts. The first part is the sum of a preset delay count value and the output of a free running counter. The second part is the value to which the input pulse signal went following the edge. Because a comparator continuously compares the first part of the current FIFO output to the count of the free running counter, the comparator's output goes active the preset number of counts after the transmit edge was input. Because this comparator output clocks a D-flip-flop whose D-input is supplied with the second part of the current FIFO output, the output of the D-flip-flop goes to the value to which the original edge went. Accordingly, the D-flip-flop output is the delayed transmit pulse edge.

Each time the comparator's output goes active, the next value stored in the FIFO becomes the FIFO output. As before, the counter increments to where the count equals the FIFO value, the comparator goes active, and the another delayed edge is generated.

BRIEF DESCRIPTION OF THE DRAWINGS

Other features of the present invention will become more fully apparent from the following detailed description of the preferred embodiment, the appended claims, and the accompanying drawing in which:

FIG. 1 (the sole figure) is a block diagram of a preferred embodiment of the invention.

DETAILED DESCRIPTION OF THE PREFERRED EMBODIMENT

The preferred embodiment of the present invention as shown in FIG. 1 includes a counter 1 connected to a Clock Input Terminal 5 for coupling counter 1 to a resolution clock. The 16-bit count output of counter 1 is connected to one 16-bit input of adder 2 and to one 16-bit input of comparator 4. The second 16-bit input of adder 2 is connected to Delay Count Input Terminal 7.

FIFO 3 is 17 bits wide. 16 bits of each word comprise the delay count from adder 2. The 16-bit output of adder 2 is connected to 16 bits of the input data word into FIFO 3. The remaining bit of each word is the level to which the input pulse went following an input pulse edge. The remaining input data bit into FIFO 3 is connected to Input Pulse Input Terminal 9.

The "write" input of FIFO 3 is connected to Input Edge Input Terminal 6. The 16 output data bits of FIFO 3 (which correspond to the 16 input data bits supplied by adder 2) are connected to the second 16-bit input of comparator 4. The output of comparator 4 is connected to the clock input of D-flip-flop 10. The output of comparator 4 is also fed back to the "read" input of FIFO 3. Initially, FIFO 3 is empty and the output of comparator 4 is held disabled via the empty output of FIFO 3.

The remaining output data bit of FIFO 3 (which corresponds to the input data bit of FIFO 3 connected to Input pulse Input Terminal 9) is connected to the D input to D-flip-flop. The output of D-flip-flop 10 is the output of the apparatus and it is connected to Delayed Pulse Output Terminal 8. Counter i is a continuously incrementing, free running 16-bit counter clocked by a resolution clock. The resolution clock is coupled to the clock input of counter 1. Adder 2 continuously adds the delay count from its Delay Count Input Terminal 7 to the continuously incrementing output of counter 1. The output of adder 2 is 16 bits of the input data word to FIFO 3.

An incoming edge at Input Edge Input Terminal 6 of FIFO 3 immediately loads these 16 bits of FIFO 3 with the sum of the current count and the delay count The incoming edge also loads the remaining input data bit of FIFO 3 with the level to which the input pulse went after the particular incoming edge. For example, a low to high edge on Input Edge Input Terminal 6 would result in a high being loaded into FIFO 3 from the Input Pulse Input Terminal 9. A high to low edge on Input Edge Input Terminal 6 would result in a low being loaded into FIFO 3 from the Input Pulse Input Terminal.

Because FIFO 3 always outputs the oldest data it stores, the recently stored delay count as well as the level to which the input pulse went following the input edge immediately appear on the output of FIFO 3. When the output of counter 1 equals the value on the 16-bit output of FIFO 3, the output of comparator 4 goes high and clocks D-flip-flop 10. Because the D input of D-flip-flop 10 is at the level to which the input pulse went after the occurrence of the input edge, the output of D-flip-flop 10 goes to that level also.

The delayed edge also causes a read of the FIFO which discards the presently outputted FIFO word and causes the next value stored in the FIFO to appear on the FIFO output.

Unlike the pulse generator techniques of the prior art, multiple values can be stored in the FIFO simultaneously. Both the rising and falling edges of multiple input pulses are pushed onto the FIFO while earlier input pulses are still being delayed. In the present invention, FIFO 3 is 64 words deep so that up to 32 transmit input pulses can be delayed simultaneously. A relatively simple FIFO memory can be used rather than the large number of counters and the associated large output multiplexer in the prior art counter technique.

To simulate a moving target with the present invention, the delay count from Delay Count Input Terminal 7 is simply changed from transmit input pulse to transmit input pulse. Increasing the delay count simulates a target moving away from the radar. Decreasing the delay count simulates a target moving toward the radar.

The amount the delay count can be increased from transmit pulse to transmit pulse is limited by the number of bits in free running counter 1. A comparison of the 16-bit output of counter 1 will match the 16-bit output of FIFO 3 within $2^{16}$ counter clocks so a delay of more than $2^{16}$ counts is not possible.

The amount the delay count can be decreased from transmit pulse to transmit pulse is also limited. Note that if the delay count were suddenly reduced it would be possible that the next number loaded into the FIFO would be smaller than the loaded number which preceded it. After a match of the count of the counter and the previous FIFO value, the smaller succeeding FIFO value will be compared to the counter output. But, because the succeeding FIFO value is smaller, the count on counter 1 will have to roll over and increment up again to match. Therefore, decreasing the delay value suddenly may actually result in an increased delay in the actual output.

This scenario can be simply avoided by decreasing delays such that succeeding values written into FIFO 3 always correspond to future count values. Decreasing the delay values in this way is not a limitation in the radar application because only one transmit pulse is delayed per radar interpulse period and the time between successive transmit pulses is equal to the interpulse period of the radar. In the case that a subsequent reflected pulse from a target were to be received at the same time as the preceding reflected pulse, the radar wave of the preceding pulse would have travelled at the speed of light for a duration of one interpulse period more than did the subsequent pulse. In the interpulse period, the preceding radar wave would have to travel to the target and return whereas the target itself would only have had to travel half that distance toward the radar. Therefore, in order to have a scenario in which transmit pulses are incorrectly delayed, the target would have to move toward the radar at a speed half of that of the speed of light. Because such rapidly moving targets are unrealistic, decrementing the delay value too rapidly is not a problem in practice.

The total maximum amount of time that a transmit pulse can be delayed is determined by the amount of time it takes counter 1 to go through its entire counting sequence. The maximum delay when the resolution clock 5 is 14 MHz and counter 1 is a 16-bit counter is on the order of milliseconds.

A delay processor for delaying 32 overlapping pulses using the prior art counter technique would require a signal demultiplexer, 64 individual counters, and a large multiplexer. With the present invention, however, significant savings in hardware are realized. Only one counter, one adder, one relatively small 64-word FIFO, and one comparator is required.

Another important aspect of the present invention is that the particular pulse width of an input pulse is preserved in the delayed output pulse. Note that if the value on delay count input terminal 7 is held constant, both of the edges of an input pulse are delayed by the same amount. The resulting output pulse therefore has the same pulse width as did the input pulse. An input pulse stream of pulses with different pulse widths will generate a delayed output pulse stream complete with the different pulse widths of the input steam. Note also that if the value on the delay count input terminal 7 is changed in between input pulses, both of the edges of the next input pulse to be input to the delay processor are also delayed by the same new amount. The resulting output pulse therefore still maintains the pulse width of the input pulse.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

I claim:

1. An apparatus for delaying a series of input pulses received on an input pulse input terminal and for outputting delayed pulses onto a delayed pulse output terminal, the apparatus allowing multiple input pulses to be simultaneously delayed, comprising:

counting means for outputting a binary number indicative of current time, said counting means having an input, and an output, said input being connected to a clock input terminal;

adding means for adding binary numbers, said adding means having a first input, a second input, and an output, said first input being connected to said output of said counting means, said second input being connected to a delay count input terminal, said adding means providing at its output a binary number which represents the sum of its first and second inputs;

first-in-first-out storing means for storing binary numbers, said first-in-first-out storing means having a write input, a data word input, a data bit input, a read input, a data word output, a data bit output, and an empty output, said write input being connected to an input edge input terminal for pushing values on said data word input onto said first-in-first-out storing means upon the occurrence of each input edge of each individual input pulse of said series of input pulses, said data word input being connected to said output of said adding means, said data bit input being connected to the input pulse input terminal so that the level to which the input pulse went following each input edge is stored in the first-in-first-out storing means, said read input causing said first-in-first-out storing means to be popped such that the next oldest stored binary numbers of said first-in-first-out storing means is outputted on said data word output and said data bit output;

comparing means for outputting a delayed clock edge when two binary numbers are equal to each other, said comparing means having a first input, a second input, a disable input, and an output, said first input being connected to said output of said first-in-first-out storing means, said second input connected to said output of said counting means, said disable input being connected to said empty output of said first-in-first-out storing means, said output being connected to said read input of said first-in-first-out storing means, said comparing means outputting said delayed clock edge when said output of said counting means equals said data word output of said first-in-first-out storing means, said comparing means outputting each delayed clock edge such that the delay time from the input edge to the corresponding delayed clock edge approximately equals the amount of time required for said counting means to count the number of clock periods on said delay count input terminal when said input edge occurred; and clocked storage means for changing the level of the signal on the delayed pulse output terminal upon the occurrence of a delayed clock edge, said clocked storage means having a data input, a clock input, and a data output, said clock input being connected to said output of said comparing means, said data input being connected to said data bit output of said first-in-first-out storing means, said data output being connected to the delayed pulse output terminal.

2. The apparatus of claim 1 wherein:

each input pulse received on the input pulse input terminal is a radar transmission from a radar system, said delayed pulses on said delayed pulse output terminal simulate reflections of radar transmissions from a simulated moving target, increasing the binary number on said delay count input terminal between successive input pulses results in increasing the delay from input pulse to output pulse thereby simulating a radar target moving away from the radar system, and decreasing the binary number on said delay count input terminal between successive input pulses results in decreasing the delay from input pulse to output pulse thereby simulating a radar target approaching the radar system.

3. A method of delaying input edges to generate delayed output edges, comprising the steps of:

generating a continuously changing time number which corresponds to the current time;

adding to the current value of said time number a pulse delay control number to generate a sum corresponding to a future value of said time number;

pushing both edge-type information and said sum into a first-in-first-out memory upon the occurrence of an input edge;

comparing the output of said first-in-first-out memory with the current value of said time number;

popping the oldest stored sum off the first-in-first-out memory to output the next oldest sum upon the condition that the output of said first-in-first-out memory equals the current value of said time number; and outputting an output edge upon the condition that the output of the first-in-first-out memory equals said current value of said time number, the type of output edge outputted being determined by the edge-type information.

* * * * *